US009489426B2

(12) United States Patent
Christodorescu et al.

(10) Patent No.: US 9,489,426 B2
(45) Date of Patent: *Nov. 8, 2016

(54) DISTRIBUTED FEATURE COLLECTION AND CORRELATION ENGINE

(71) Applicant: International Business Machines Corporation, Armonk, NY (US)

(72) Inventors: Mihai Christodorescu, Briarcliff Manor, NY (US); Xin Hu, White Plains, NY (US); Douglas Lee Schales, Ardsley, NY (US); Reiner Sailer, Scarsdale, NY (US); Marc P. Stoecklin, Riverdale, NY (US); Ting Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 346 days.

This patent is subject to a terminal disclaimer.

(21) Appl. No.: 13/967,730

(22) Filed: Aug. 15, 2013

(65) Prior Publication Data

US 2014/0351227 A1    Nov. 27, 2014

Related U.S. Application Data

(63) Continuation of application No. 13/899,784, filed on May 22, 2013.

(51) Int. Cl.
*G06F 17/30* (2006.01)
(52) U.S. Cl.
CPC ... *G06F 17/30489* (2013.01); *G06F 17/30477* (2013.01)
(58) Field of Classification Search
CPC ............... G06F 17/30487; G06F 17/30867; G06F 17/30477

USPC ................................................ 707/687–704
See application file for complete search history.

(56) References Cited

U.S. PATENT DOCUMENTS

| 6,978,275 | B2 | 12/2005 | Castellanos et al. |
|---|---|---|---|
| 2007/0183655 | A1 | 8/2007 | Konig et al. |
| 2010/0223244 | A1* | 9/2010 | Sinha et al. .................. 707/705 |
| 2012/0215829 | A1 | 8/2012 | Naphade et al. |
| 2012/0310882 | A1* | 12/2012 | Werner et al. ................ 707/624 |
| 2013/0275656 | A1* | 10/2013 | Talagala .............. G06F 12/0246 711/103 |
| 2013/0339366 | A1* | 12/2013 | Khimich et al. .............. 707/741 |

FOREIGN PATENT DOCUMENTS

WO    2007147166    12/2007

* cited by examiner

*Primary Examiner* — Etienne Leroux
*Assistant Examiner* — Cindy Nguyen
(74) *Attorney, Agent, or Firm* — Ryan, Mason & Lewis, LLP

(57) ABSTRACT

A distributed feature collection and correlation engine is provided. Feature extraction comprises obtaining one or more data records; extracting information from the one or more data records based on domain knowledge; transforming the extracted information into a key/value pair comprised of a key K and a value V, wherein the key comprises a feature identifier; and storing the key/value pair in a feature store database if the key/value pair does not already exist in the feature store database using a de-duplication mechanism. Features extracted from data records can be queried by obtaining a feature store database comprised of the extracted features stored as a key/value pair comprised of a key K and a value V, wherein the key comprises a feature identifier; receiving a query comprised of at least one query key; retrieving values from the feature store database that match the query key; and returning one or more retrieved key/value pairs.

20 Claims, 9 Drawing Sheets

FIG. 3B

```
for newly arriving key-value pair K-V with time TS do
  R ← lookup of local feature store using key K
  if R = ∅ then
    store tuple ⟨K.(TS.V)⟩          new record is created
  else
    if V exists in R then
      TS' ← timestamp associated with V in R
      if TS < TS' then
        replace TS' with TS in R
        write R to feature store    update timestamp
      end if
    else
      append (TS.V) to R
      write R to feature store      append new value
    end if
  end if
end for
```

FIG. 4A

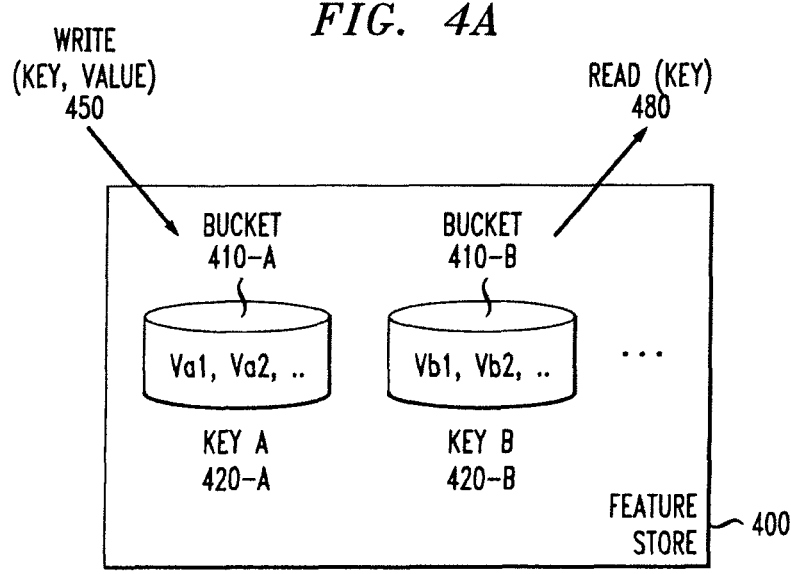

DISTRIBUTED FEATURE COLLECTION AND CORRELATION ENGINE

CROSS-REFERENCE TO RELATED APPLICATIONS

This application is a continuation of U.S. patent application Ser. No. 13/899,784, filed May 22, 2013, incorporated by reference herein.

FIELD OF THE INVENTION

The present invention relates generally to the electrical, electronic and computer arts, and, more particularly, to techniques for obtaining and processing data.

BACKGROUND OF THE INVENTION

Many enterprises have been challenged by a shift to sophisticated and evolving cyber security threats. Attackers are increasingly applying stealthy attack techniques to help hide their presence or, at least, reduce the probability of being detected, e.g., by concealing their attack steps over multiple machines and exploiting different application protocols, or spreading their activities over long periods of time. Many of these threats are referred to as advanced persistent threats (APT).

Detecting and investigating such complex attack patterns requires the collection, storage, and analysis of events from a variety of vantage points, different data sources, and multiple abstraction layers. The monitoring data, often exported at rates of many thousands of events per second, needs to be collected, stored, and made available for real-time and historical analysis. With such a load and variety of relevant data types and varying collection delays, cyber security threat investigation has turned into a significant data problem. Many collected events only become meaningful when they are put into context across different data sources over potentially large time windows (such as weeks or months) to form a big picture of ongoing and past activities in the network and to filter out false alarms or anomalies having little or no impact.

Timely responses to such security incidents require near real-time analysis of the data, while investigations require access to historical data spanning large time windows. Existing solutions, however, process data in real time with a relatively small time window or only support historical data and require sequential access to the stored data. Input/Output (IO) limits become the dominating factor and existing solutions work around this by distributing the IO across large clusters of machines with increasing cost of setup and recombination of results.

A need exists for improved techniques for obtaining and processing raw data. A further need exists for a data processing system that permits (i) substantially real-time analysis of the data to provide a timely response to an incident; and (ii) access to historical data spanning large time windows to permit investigations.

SUMMARY OF THE INVENTION

Generally, methods and apparatus are provided for distributed feature collection and correlation. According to one aspect of the invention, a feature extraction data processing method comprises the steps of obtaining one or more data records; extracting information from the one or more data records based on domain knowledge; transforming the extracted information into a key/value pair comprised of a key K and a value V, wherein the key comprises a feature identifier; and storing the key/value pair in a feature store database if the key/value pair does not already exist in the feature store database using a de-duplication mechanism.

According to one aspect of the invention, a method for querying one or more features extracted from one or more data records comprises the steps of obtaining a feature store database comprised of the extracted features stored as a key/value pair comprised of a key K and a value V, wherein the key comprises a feature identifier; receiving a query comprised of at least one query key; retrieving values from the feature store database that match the query key; and returning one or more retrieved key/value pairs.

A more complete understanding of the present invention, as well as further features and advantages of the present invention, will be obtained by reference to the following detailed description and drawings.

BRIEF DESCRIPTION OF THE DRAWINGS

FIGS. 3A and 3B are flow charts describing exemplary implementations of a feature collector incorporating aspects of the present invention;

FIG. 4A illustrates an exemplary feature store incorporating aspects of the present invention;

DETAILED DESCRIPTION OF PREFERRED EMBODIMENTS

Aspects of the present invention provide a feature collection and correlation engine (FCCE). According to one aspect of the invention, the exemplary disclosed FCCE system comprises a distributed data management system that extracts, normalizes, stores, retrieves and correlates features from diverse network data sources. The exemplary FCCE system supports geographically distributed data sources not requiring continuous connectivity between the sources and provides resilience against failures of individual nodes within the distributed engine architecture.

According to another aspect of the invention, domain knowledge can be leveraged to extract core features at the point where the data is ingested, using a de-duplication mechanism, such that the amount of data is greatly reduced, with a hierarchically structured collection system, such that the de-duplicated core features across all the data sets arrive at a conceptually central location, where they are available either in near real-time, or can be accessed in a historical manner to detect or investigate cyber threats.

According to yet another aspect of the invention, a key and value are defined for each feature extracted. The key is used to identify a particular bucket of values that is treated as a mathematical set. The mathematical sets allow data to be ingested without consideration of temporal ordering. In this manner, older historical data sets can be ingested into the system along with real-time data.

Figure 1:
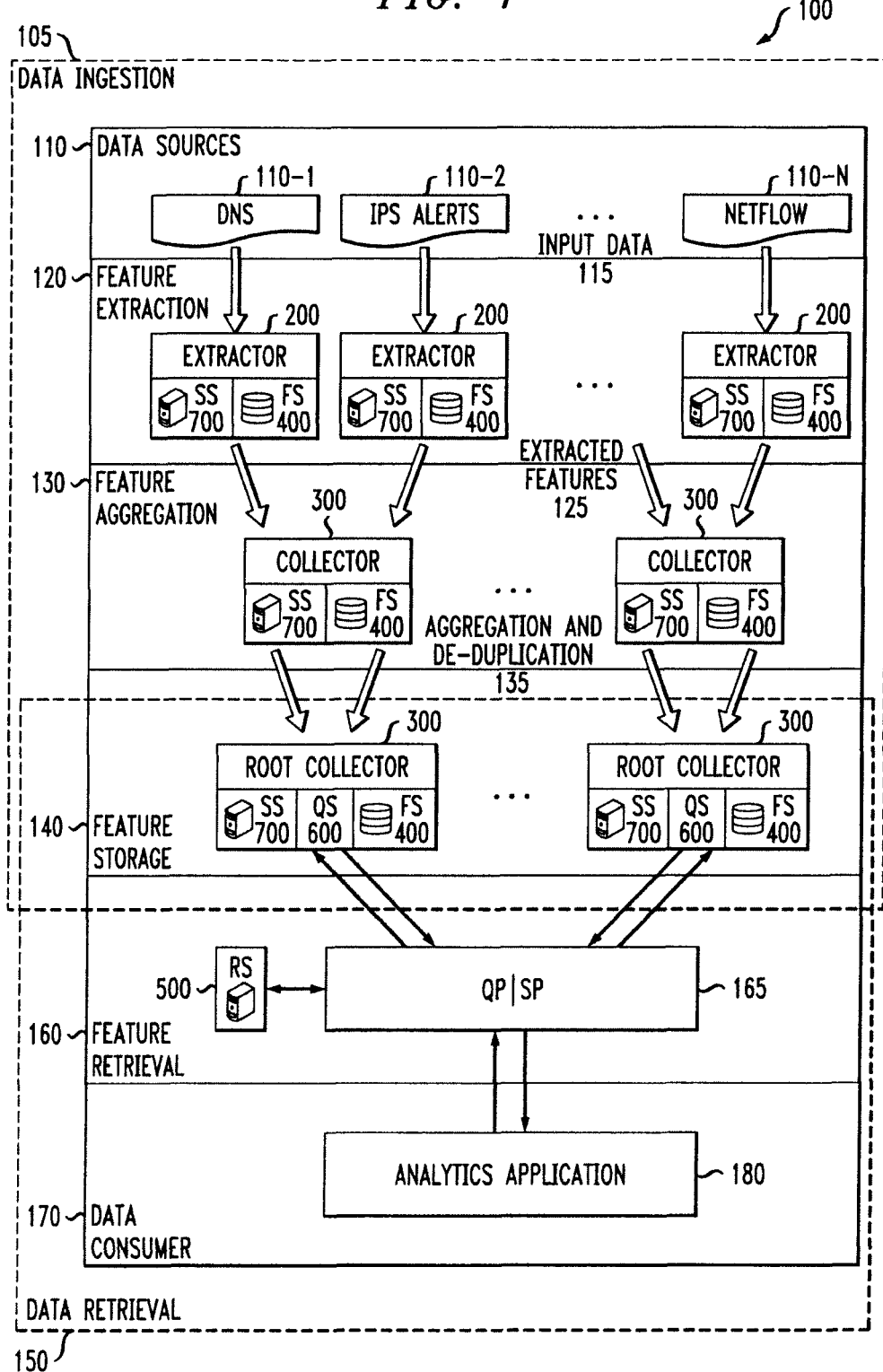
FIG. 1 is a block diagram of an exemplary feature collection and correlation engine (FCCE) system that incorporates aspects of the invention.

FIG. 1 is a block diagram of an exemplary feature collection and correlation engine (FCCE) system 100 that incorporates aspects of the invention. As shown in FIG. 1, an exemplary embodiment of the FCCE system 100 comprises a data ingestion framework 105 of feature extraction 120 (ingesting and processing raw data from data sources 110 to abstract extracted features 125); feature aggregation 130 (collecting and merging extracted features 125 from different data sources 110); and feature storage 140 (storing the aggregated and de-duplicated results 135). In addition, the exemplary embodiment of the FCCE system 100 comprises a data retrieval framework 150 that comprises a feature retrieval layer 160 that provides an interface for efficient querying features of interest by data consumers 170.

As shown in FIG. 1, the exemplary FCCE system 100 comprises at least one feature extractor 200, discussed further below in conjunction with FIG. 2, at least one feature collector 300, discussed further below in conjunction with FIG. 3, at least one feature store 400, discussed further below in conjunction with FIG. 4, optionally one or more registry servers 500, discussed further below in conjunction with FIG. 5, optionally one or more query servers 600, discussed further below in conjunction with FIG. 6, and optionally one or more subscription servers 700, discussed further below in conjunction with FIG. 7.

Generally, as discussed hereinafter, the exemplary feature store 400 is based on a key-value store and stores features related to raw data that are later used for retrieval of correlated features in a highly scalable manner. Generally, the exemplary feature extractor 200 connects to raw data sources 110 (live or batch/stored) and extracts features that are forwarded to at least one feature collector 300. In an exemplary embodiment, the data sources 110 comprise domain name server (DNS) data 110-1, Intrusion Prevention System (IPS) alerts 110-2 and netflow data 110-N. The exemplary feature collector 300 then validates the features and stores them in at least one feature store 400.

The data retrieval framework 150 of the FCCE system 100 supports retrieval of correlated features. A client (e.g., analytics applications 180 and visualization tools) can either query a selected feature store 400 or ask one more query servers 600 to return features from the feature store 400 that match provided keys. A query server 600 will return any features currently available in its feature store 400 that match the provided keys. Clients can also request features from one or multiple subscription servers 700, which will continuously return any new features entering the feature store 400 that match the keys. A query provider/subscription provider 165 provides a front-end or middle layer for clients to communicate with the feature stores 400, registry server 500, query servers 600 and subscription servers 700.

A registry server 500 can broker connections between any of the components. Components register with the registry server 500 and advertise their capabilities with the registry server 500. Other components and clients can then query the registry server 500 for any registered components based on provided capabilities.

One or more analytics application 180 can be provided to efficiently access the features.

Feature Extraction

Figure 2:
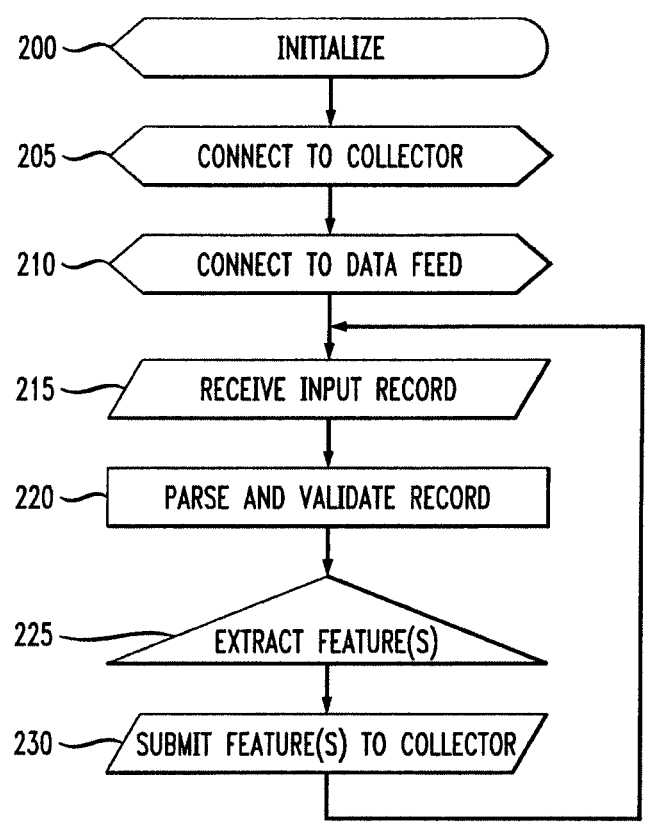
FIG. 2 is a flow chart describing an exemplary implementation of a feature extractor incorporating aspects of the present invention.

FIG. 2 is a flow chart describing an exemplary implementation of a feature extractor 200 incorporating aspects of the present invention. Generally, as discussed further below, during a feature extraction phase 120, for each input data source 110, domain experts specify methods of abstracting features from the raw data, using a feature extractor 200. Each individual data input is associated with one or more extractors 200. The extracted features from each individual data input can then be directly forwarded to the next phase or de-duplicated and cached in local, transient feature stores 400. These transient feature stores 400 constitute the locally derived knowledge from the associated data inputs 110.

The feature extractor 200 extracts features from the associated data input 115 and encodes the features into a pre-defined format. More specifically, the ingested data is decoded by a data type-specific component, and the desired information is extracted from the data records. Each piece of the information is transformed (based on domain knowledge) into a key-value pair. In addition, a timestamp (TS) can be attached to each key-value pair and a feature identifier is contained within the key. Each key-value pair is then encoded into a format defined by the implementation, with the encoded key as K and the encoded value as V.

As shown in FIG. 2, the feature extractor 200 is initialized and reads a configuration from a local file and/or from a registration server 500 and retrieves a location of data source 110 and collector(s) 300. The feature extractor 200 connects to configured collectors 300 during step 205 and then connects to configured data sources 110 during step 210.

During step 215, the feature extractor 200 listens and receives a record from a data source 110. The received record is parsed and validated during step 220. The feature extractor 200 extracts feature(s) from the record during step 225. The extracted features are submitted to the configured and connected collectors 300 during step 230 and then returns to the listening step 215.

Feature Aggregation

After feature extraction, the local knowledge is aggregated at different extractors to form a global view, using one or more feature collectors 300. Each collector 300 takes as input the features extracted by multiple extractors 200 and aggregates the results by de-duplicating any redundant features. At each collector 300, a local feature store 400 is maintained to store the derived, de-duplicated knowledge from all the inputs feeding it. In the same manner as the extractors 200, a collector 300 can optionally forward new values to one or more other collectors 300, allowing a hierarchical structure (e.g., tree) for the purpose of scalability.

Figure 3A:
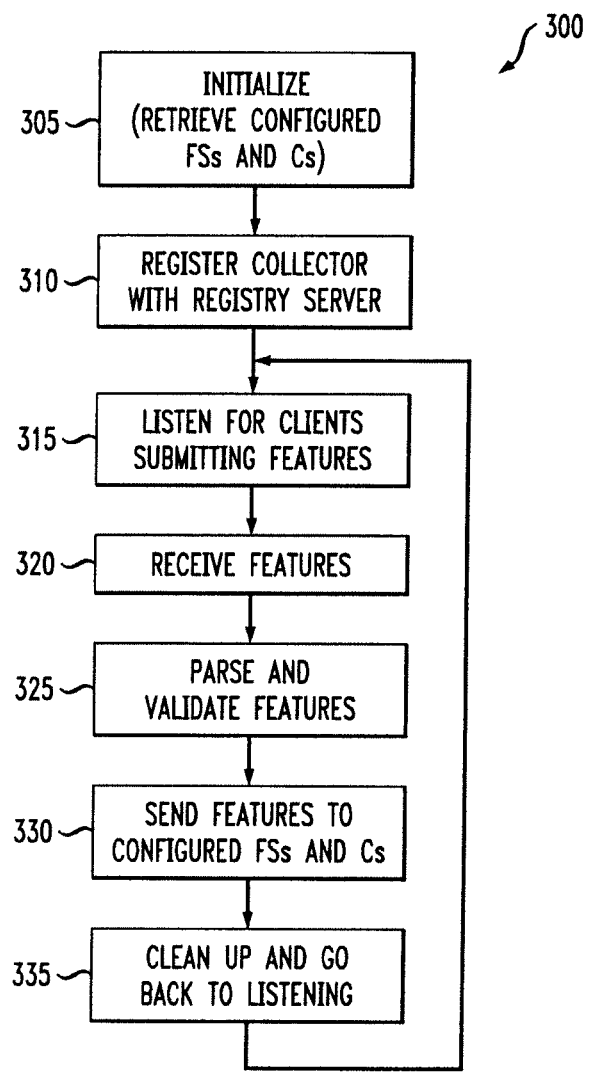

FIG. 3A is a flow chart describing an exemplary implementation of a feature collector 300 incorporating aspects of the present invention. Generally, as discussed further below, a collector 300 is responsible for aggregating the features fed by multiple extractors 200 (or peer collectors 300) and de-duplicating any redundancy in the input.

As shown in FIG. 3A, the feature collector 300 is initialized during step 305 by reading configured feature stores 400 and/or other collectors 300 that receive from this collector 300. During step 310, the collector instance of this feature collector 300 is registered with the registry server 500 so clients can find it.

The feature collector 300 enters into a listening mode during step 315 to accept new features from client(s). The feature collector 300 receives and normalizes features from multiple clients simultaneously during step 320, and parses and validates received features during step 325.

During step 330, the feature collector 300 forwards features to all configured feature stores 400 (using a write operation to each feature store 400) and to all configured collectors 300. The feature collector 300 cleans up and returns during step 335 to step 315 to listen to new client requests.

For a newly arriving feature value pair K-V (associated by timestamp TS), a collector 300 implements the steps shown in FIG. 3B. It is noted that every tuple {K; (TS; V)} written to the local feature store 400 is also forwarded to the designated collector(s) 300 in the hierarchy. As shown in FIG. 3B, the key K is used to lookup a record in a key/value style database. If the lookup fails, then the key K and value V are new. A new record is written to the database keyed with K and a value of {TS,V}. Otherwise, the record is searched to determine if V already exists in the record. If V does not exist in the record, then {TS,V} are appended to the record and stored in the database and K+{TS,V} are forwarded to the defined collectors 300.

Otherwise, the time stamp TS is compared to the time stamp already associated with V. If the new timestamp TS is earlier than the previous timestamp, then the new timestamp TS is placed in the record with V and the record updated in the database and K+{TS,V} are forwarded to the defined collectors 300.

At the bottom of the hierarchy in the feature storage layer 140, one or more collectors 300 are designated as the Root Collectors 300, which provide the permanent storage for the collected features, as well as the Query Service (QS) 600 for accessing the information.

Feature Store

The feature values in each bucket are treated as a mathematical set. The collection of all such sets forms the feature store (FS) 400. The use of mathematical sets to aggregate features allows ingestion of data without considering their temporal ordering, which is beneficial for distributed environments. Further, the mathematical sets enable efficient merging of different data inputs that become available at different points in time.

In an exemplary implementation, the feature store 400 is implemented in C and utilizes a custom key/value store as the underlying storage mechanism. Features are represented in the key/value pair themselves. Both the key and value can be encoded in an implementation specific encoding. By using this encoding throughout the system 100, the key and values can be processed by various components without the need for understanding the specifics of the encoded data.

The feature store manager provides an API for adding new features to the store and querying information from the store. Both of these operations are asynchronous (i.e., work is queued). In addition, the feature store manager provides the framework for the feature subscription service (SS) 700.

Figure 4B:
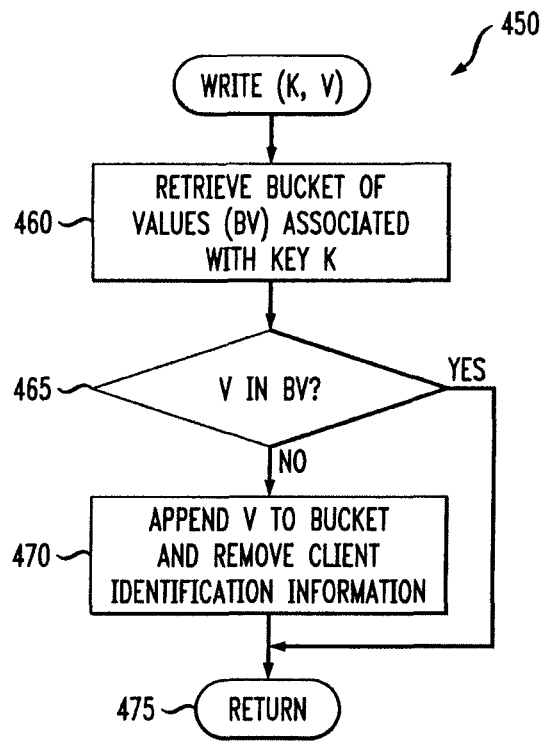
FIG. 4B is a flow chart describing an exemplary implementation of a write process of the feature store incorporating aspects of the present invention.

FIG. 4A illustrates an exemplary feature store 400 incorporating aspects of the present invention. As shown in FIG. 4A, the exemplary feature store 400 comprises a plurality of buckets 410-A, 410-B that store a set of values, Va1, Va2, . . . , and Vb1, Vb2, . . . , respectively. Each bucket 410-A, 410-B, is uniquely identified by a corresponding key 420-A, 420-B. Values are written to the feature store 400 using a write process 450, as discussed further below in conjunction with FIG. 4B, and are read from the feature store 400 using a read process 480, as discussed further below in conjunction with FIG. 4C.

FIG. 4B is a flow chart describing an exemplary implementation of a write process 450 incorporating aspects of the present invention. Generally, the write process 450 writes a key-value pair (k,v) to the feature store 400. As shown in FIG. 4B, the write process 450 initially retrieves a bucket of values associated with the key K during step 460. Thereafter, a test is performed during step 465 to determine if 'V' is already in the bucket. If it is determined during step 465 that 'V' is not already in the bucket, then append V to bucket, remove client information during step 470 and return during step 475. If, however, it is determined during step 465 that 'V' is already in the bucket, then return during step 475.

Figure 4C:
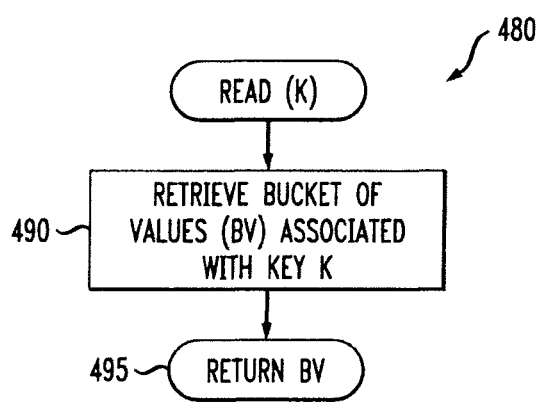
FIG. 4C is a flow chart describing an exemplary implementation of a read process of the feature store incorporating aspects of the present invention.

FIG. 4C is a flow chart describing an exemplary implementation of a read process 480 incorporating aspects of the present invention. Generally, the read process 480 reads a key value (K) from the feature store 400. As shown in FIG. 4C, the exemplary read process 480 retrieves a bucket of values (BV) associated with the key K during step 490 and returns the values during step 495.

The order in which values are written by the exemplary feature store 400 does not make a difference (thus accommodating live and historical data). In addition, the exemplary feature store 400 performs data de-duplication and streaming and provides distributed I/O-storage and computation.

Registry Server

The exemplary registry server 500 comprises a query server registration process 510 and a client query server discovery process 550, as discussed further below in conjunction with FIGS. 5A and 5B, respectively. Generally, the registry server 500 provides a registration service (RS) that is used to locate services. An exemplary implementation has a registry server 500 on every node in the system 100. The local registry servers 500 contain only information about services that are only available on the local node. This enables locally contained operations to run even when the node becomes temporarily isolated or disconnected. Global information is forwarded to a set of global registration servers 500. The actual forwarding can be offloaded to the local registration servers 500, which are responsible for ensuring that the information eventually reaches the global servers 500.

Registration information consists of a set of key/value pairs. The following example indicates the presence of a tap service (with identifier tap1) for the data type DNS in a zone rcx, whose service interface listens on 10.10.0.5:55000:

' class=tap,type=dns,zone=rcx,tapid=tap 1,
address=10.10.0.5,port=55000'

A query to the registration server 500 provides some subset of the key/values and all entries that match will be returned. Thus, a query for 'class=tap,type=dns,zone=rcx,tapid=tap1' would match the above and return all the values. This functionality is also used to locate where features may reside.

Figure 5A:
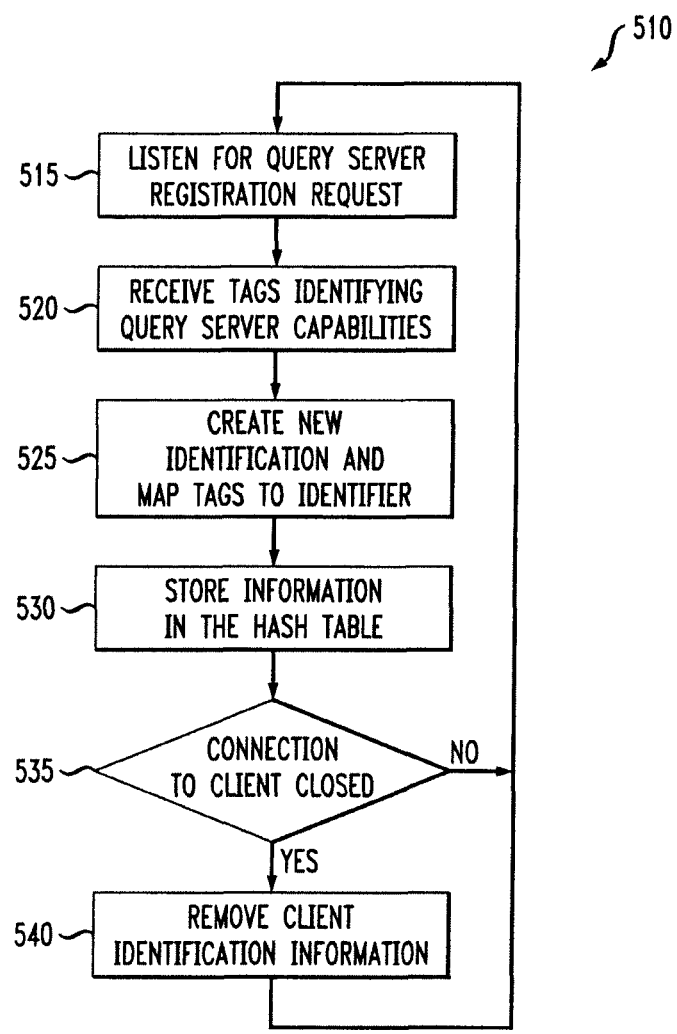
FIGS. 5A and 5B, respectively, are flow charts describing exemplary implementations of a query server registration process and a client query server discovery process provided by the exemplary registry server.

FIG. 5A is a flow chart describing an exemplary implementation of a query server registration process 510 incorporating aspects of the present invention. The query server registration process 510 initially listens for registration requests from query servers 600 during step 515. Thereafter, the query server registration process 510 receives a set of tags (key/value pairs) identifying capabilities of the registering query server 600 during step 520.

The query server registration process 510 creates an identification for registration and maps tags to this new identifier during step 525. The associated information is stored in a hash-table with the tags as a key during step 530. A test is performed during step 535 to determine if the connection to the registered query server closes. If it is determined during step 535 that the connection to the registered query server closes, then remove the identification information from the hash table during step 540 and return to listening state during step 515.

If, however, it is determined during step 535 that the connection to the registered query server does not close, then go to listening state during step 515.

Figure 5B:
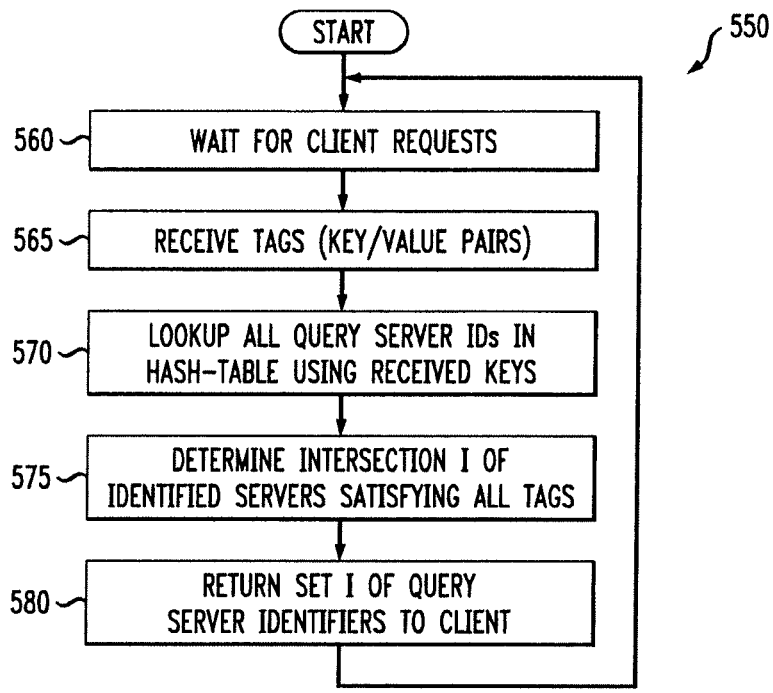

FIG. 5B is a flow chart describing an exemplary implementation of a client query server discovery process 550 incorporating aspects of the present invention. As shown in FIG. 5B, the client query server discovery process 550 initially waits for client requests during step 560. The client query server discovery process 550 receives tags (key/value pairs) from a client during step 565 and then looks up all query server identifiers in a hash table during step 570 using the provided keys.

The client query server discovery process 550 then determines an intersection I of all query server identifiers satisfying all tags during step 575 and returns the set I of identifiers to the client during step 580. Program control then returns to the listening step 560.

Query Server

The exemplary FCCE provides a query interface that supports multiple ways of accessing the derived knowledge. The registration service (RS) 500 can be used to find the root collector 300 that stores the features of interest. In addition, a query server 600 can be employed to query the corresponding feature store 400 using specific feature types and keys as query predicates; Further, a user can subscribe to specific extractors/collectors (as routed by the registration service) about feature types of interest using the subscription server 700.

The query server 600 provides access to the features in the feature stores 400, which allows an analyst to look up the feature store 400 using feature types (feature identifier) and query key(s) as query predicates. The query server 600 can provide a feature identifier to indicate the types of features of interest, as well as one or more query keys. Each query key is combined with the feature identifier and encoded using the same data encoding format used in the extraction step creating a set of encoded keys [K]. For each of the encoded keys in [K], a lookup is used to query the key/value database. If the lookup fails, then either nothing is done, or the failed key is emitted with an indication that the lookup failed. Otherwise, for each value in the retrieved record, the encoded {TS,V} are decoded and the K+{TS,V} are emitted.

Figure 6:
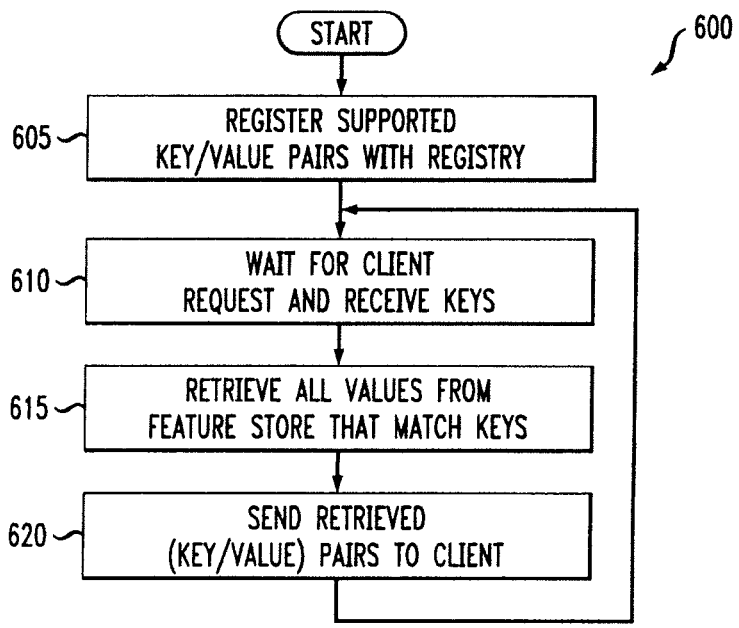
FIG. 6 is a flow chart describing an exemplary implementation of a query server process incorporating aspects of the present invention.

FIG. 6 is a flow chart describing an exemplary implementation of a query server process 600 incorporating aspects of the present invention. As shown in FIG. 6, when a query server 600 is started, the supported key/value pairs are registered with the registry server 500 during step 605. The query server 600 then waits for client requests during step 610 and receives keys.

The query server 600 then retrieves all values from the feature store 400 that match the received key during step 615, using the read process 480 (FIG. 4C), and sends the retrieved key/value pairs to the client during step 620. The query server 600 then returns to the waiting state 610.

The query server 600, co-located at root collector nodes 300, maintains registrations that provide higher level keying information about what data is in their feature stores 400. For example, a query server 600 might be registered as a feature store class (fs), offering the feature IPByNameDate for the date range between 2012/04/01 and 2012/04/02, where two different query servers 600 (hosted on nodes 10.10.0.6 and 10.10.0.7) offer features for the same date.

'class=fs,feature=IPByNameDate,date=20120401, address=10.10.0.6,port=12345'
'class=fs,feature=IPByNameDate,date=20120401, address=10.10.0.7,port=12345'
'class=fs,feature=IPByNameDate,date=20120402, address=10.10.0.7,port=12345'

A query interface can locate all the query servers 600 offering features with the name IPByNameDate by requesting 'class=fs,feature=IPByNameDate' at the registry server 500. This query would return the two registered query servers 600. If only information from the date 2012/04/02 was desired, the query interface would request 'class=fs,feature=IPByNameDate,date=20120402'

The query interface then sends the query directly to the resulting set of query servers 600, identified by their IP address and port number. While the registry server 500 provides a very high performance service, in practice, the query service would cache lookups and not have to perform the registration lookup for every query to be performed.

Subscription Server

The exemplary subscription server 700 comprises a new clients/pattern subscription process 710 and a new matching features streaming process 750, as discussed further below in conjunction with FIGS. 7A and 7B.

Figure 7A:
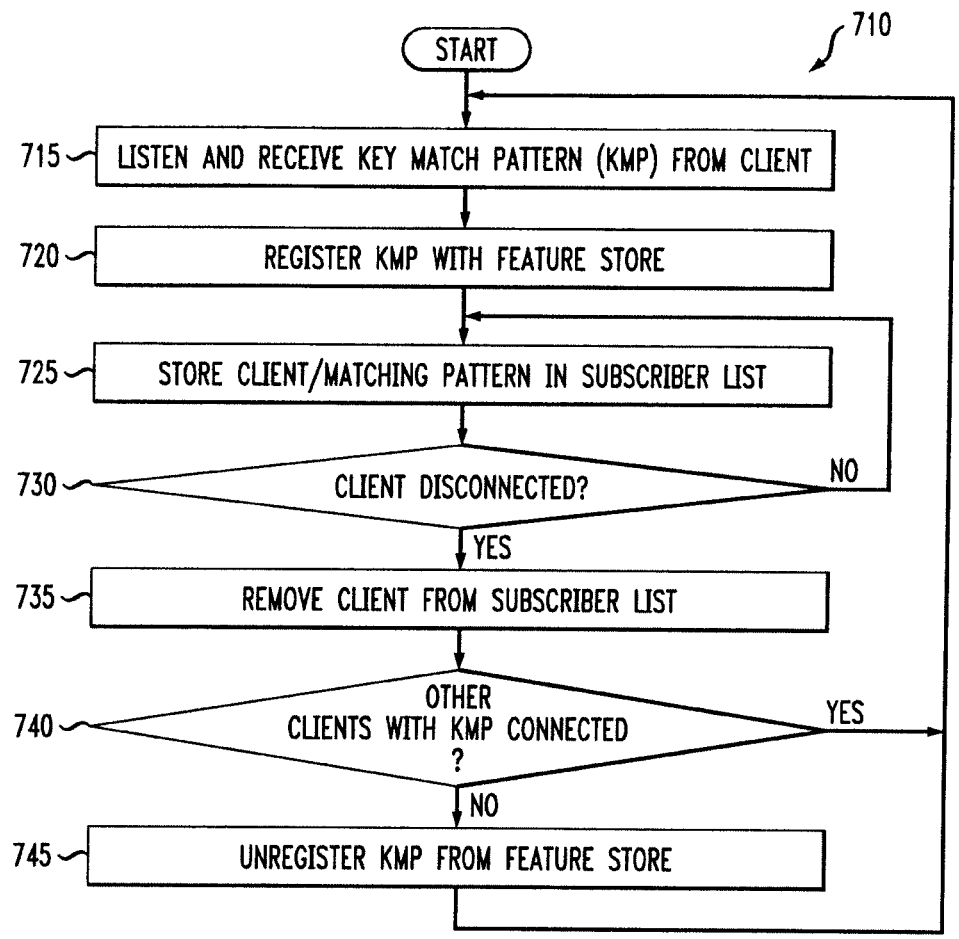
FIGS. 7A and 7B, respectively, are flow charts describing exemplary implementations of a new clients/pattern subscription process and a new matching features streaming process provided by the exemplary subscription server.

FIG. 7A is a flow chart describing an exemplary implementation of a new clients/pattern subscription process 710 incorporating aspects of the present invention. As shown in FIG. 7A, the exemplary new clients/pattern subscription process 710 initially listens and receives key match patterns (KMP) from a client during step 715.

The new clients/pattern subscription process 710 then registers the key match pattern with the feature store 400 during step 720 and stores the client/matching pattern in a subscriber list during step 725.

When the new clients/pattern subscription process 710 detects that a client disconnects during step 730, the client is removed from the subscription list during step 735.

If the new clients/pattern subscription process 710 detects that no other clients with KMP are connected during step 740, the new clients/pattern subscription process 710 unsubscribes the KMP from the feature store 400 during step 745. Program control then returns to the listening step 715.

Figure 7B:
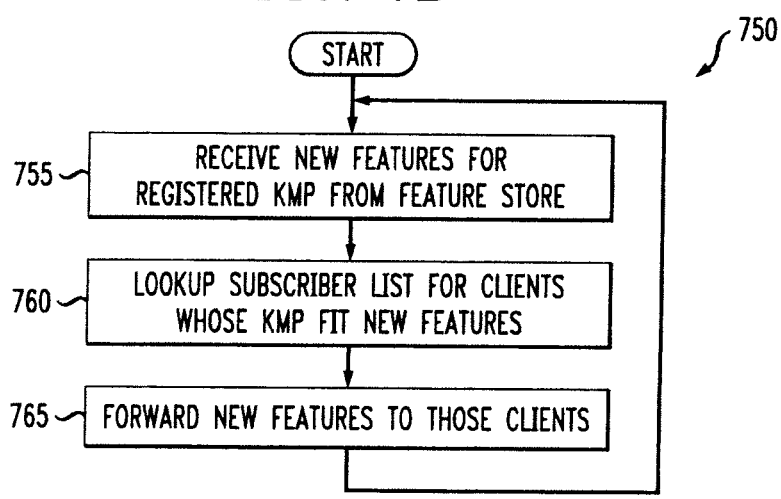

FIG. 7B is a flow chart describing an exemplary implementation of a new matching features streaming process 750 incorporating aspects of the present invention. As shown in FIG. 7B, the exemplary new matching features streaming process 750, initially receives new features for a registered matching pattern from the feature store 400 during step 755. The new matching features streaming process 750 then looks up clients whose matching pattern fit the new feature during step 760 and forwards the new features to clients that submitted matching patterns for the newly received features during step 765. Program control then returns to step 755.

Figure 8:
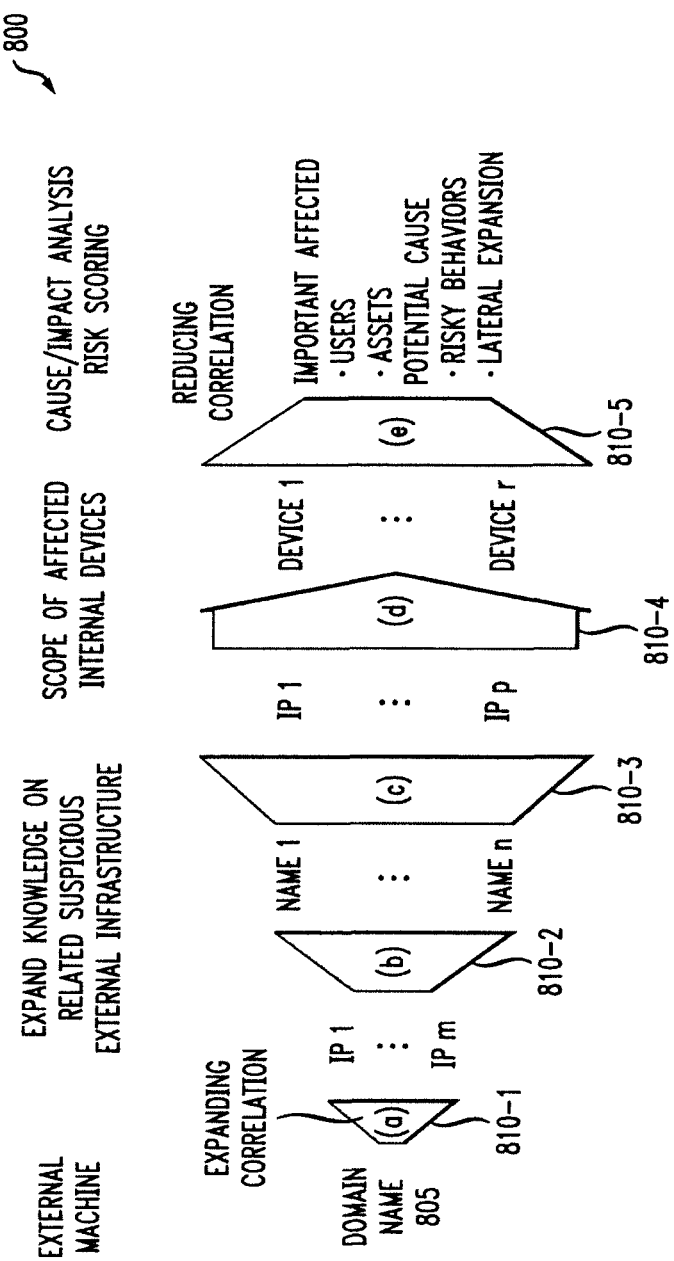
FIG. 8 illustrates an exemplary analysis of a security threat in accordance with aspects of the present invention.

FIG. 8 illustrates an exemplary analysis 800 of a security threat in accordance with aspects of the present invention. The exemplary analysis 800 automatically extracts correlated events from different locations, data sources, and time periods.

Cyber security attacks are becoming ever more sophisticated requiring analysis of large volumes of diverse data in order to detect or investigate them. Timely response to the incidents requires near real-time analysis of the data, while investigations require access to historical data spanning large time windows.

The exemplary analysis 800 analyzes the scope of the impact of a known malicious or suspicious external machine (given its Fully Qualified Domain Name 805) in five stages 810-1 through 810-5, whereby the output of one correlation stage 810-$i$ is fed as input into the next stage(s) 810-$i$+1. At stage 810-1, the exemplary analysis 800 looks up all the IP addresses related to the investigated external domain name 805 of external machines. Thereafter, the analysis 800 expands knowledge on related suspicious external infrastructure.

At stage 810-2, the exemplary analysis 800 finds all other names resolving to any of those IP addresses, both historically and in real-time. This expands our knowledge from a single system that has been reported to be hosting malicious activities (e.g., by blacklists or external investigation reports) or detected locally as the source of malicious activity (e.g., by botnet analytics) into the larger network infrastructure related to this system.

At stage 810-3, the exemplary analysis 800 looks up all the IP addresses that have been returned for any of those names during the investigation time period (e.g., one month). At this point, the analysis has expanded the knowledge about the external infrastructure that may be related to the incident and has looked three times at the DNS data collected during this time period with changing input; an operation, which is hard to parallelize.

The analysis 800 then analyzes the scope of affected internal devices. At stage 810-4, the exemplary analysis 800 transfers analysis from the 'outside' to the 'inside' of the monitored network and determines all internal devices that either looked up any of the external names (DNS messages) and/or connected (network flows) to any of the external IP addresses. Flows and lookups deliver internal IP addresses, that are within stage 810-4 automatically translated into MAC addresses (using historical DHCP/ARP information) and then collapsed to the different devices (e.g., unifying wireless and wired MAC addresses to a single machine).

The analysis 800 then performs a cause/impact analysis and risk scoring. At stage 810-5, starting from those devices, the exemplary analysis 800 looks up which credentials have been used on those devices (SSO, authentication logs) and that may have been exposed on those suspicious devices, or which high value assets have been accessed from those devices (network flows, high value asset information).

The number of further investigated devices can be reduced by prioritizing them according to the privileges of the user credentials or the accessed servers hosting valuable assets.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation that comprise, for example, a processor, a memory, and an input/output interface formed, for example, by a display and a keyboard, in a known manner. The memory may store, for example, code for implementing the various processes described herein.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor, memory, and input/output interface such as display and keyboard, can be interconnected, for example, via a bus as part of a data processing unit. Suitable interconnections can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor coupled directly or indirectly to memory elements through a system bus. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards, displays, pointing devices, and the like) can be coupled to the system either directly (such as via a bus) or through intervening I/O controllers (omitted for clarity).

Network adapters such as a network interface may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 502. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for processing data, the apparatus comprising:
   a memory; and
   at least one processing device, coupled to the memory, operative to:
   obtain one or more data records;
   extract feature information from said one or more data records, wherein the extracting is performed based on domain knowledge;
   transform said extracted feature information into a transformed key/value pair comprised of a key and a value, wherein said key comprises a feature identifier of said extracted feature information;
   store said transformed key/value pair in a given bucket of values in a feature store database comprised of a plurality of buckets of values only if said key/value pair does not already exist in said feature store database using a de-duplication mechanism by determining if said value of said transformed key/value pair is already in said given bucket, wherein said given bucket is identified by said key comprising said feature identifier of said transformed key/value pair; and
   wherein said bucket of values comprise a mathematical set that stores a given value based on a timestamp of said given value and without regard to an order in which said values are written to said bucket.

2. An article of manufacture for processing data, comprising a tangible machine readable recordable medium containing one or more programs which when executed implement the steps of:
   obtaining one or more data records;
   extracting feature information from said one or more data records based on domain knowledge;
   transforming, using at least one processing device, said extracted feature information into a transformed key/value pair comprised of a key and a value, wherein said key comprises a feature identifier of said extracted feature information;
   storing, using at least one processing device, said transformed key/value pair in a given bucket of values in a feature store database comprised of a plurality of buckets of values only if said key/value pair does not already exist in said feature store database using a de-duplication mechanism by determining if said value of said transformed key/value pair is already in said given bucket, wherein said given bucket is identified by said key comprising said feature identifier of said transformed key/value pair; and
   wherein said bucket of values comprises a mathematical set that stores a given value based on a timestamp of said given value and without regard to an order in which said values are written to said bucket.

3. The article of manufacture of claim 2, wherein said storing step further comprises the steps of using the key to look up a record in said feature store database and, if the lookup fails, determining that the key and the value are new and writing a new record to the feature store database keyed with the key and a value.

4. The article of manufacture of claim 2, wherein said storing step further comprises the steps of searching a record in said feature store database to determine if the value already exists in the record.

5. The article of manufacture of claim 4, wherein said value does not exist in the record, and said article of manufacture further comprises the step of appending the value to the record and storing said record in the feature store database.

6. The article of manufacture of claim 5, further comprising the step of forwarding said key/value pair to one or more defined collectors.

7. The article of manufacture of claim 4, wherein said value exists in the record, and said article of manufacture further comprises the step of comparing a new time stamp associated with said extracted key/value pair to an existing time stamp already associated with said value in said existing record and, if the new timestamp is earlier than the existing time stamp, then placing the new timestamp in the record with the value and updating the record in the feature store database.

8. The article of manufacture of claim 7, further comprising the step of forwarding said key/value pair and time stamp to one or more defined collectors.

9. The article of manufacture of claim 2, further comprising the step of associating a timestamp with the key/value pair.

10. The article of manufacture of claim 2, wherein said extracted features are processed one or more of in real-time and in a historical manner.

11. The article of manufacture of claim 2, wherein said data records are geographically distributed.

12. The article of manufacture of claim 2, wherein said obtaining and extracting steps employ a hierarchically structured collection system.

13. An apparatus for querying one or more features extracted from one or more data records, the apparatus comprising:
- a memory; and
- at least one processing device, coupled to the memory, operative to:
- obtain a feature store database comprised of a plurality of buckets of values, wherein said feature store is comprised of said features extracted from said one or more data records stored as a key/value pair comprised of a key and a value, wherein said key comprises a feature identifier of a given one of said extracted features, wherein said key/value pair is stored in a given bucket identified by said key comprising said feature identifier, wherein said bucket of values comprises a mathematical set that stores a given value based on a timestamp of said given value and without regard to an order in which said values are written to said bucket;
- receive a query comprised of at least one query key, wherein each of said at least one query key is combined with at least one of said feature identifiers;
- retrieve values from the feature store database that match the query key by employing a read process that reads a key value from the feature store database by retrieving a given one of said buckets of values associated with the key value; and
- return one or more retrieved key/value pairs.

14. The apparatus of claim 13, wherein said at least one processing device is further configured to register supported key/value pairs with a registry.

15. The apparatus of claim 13, wherein said at least one processing device is further configured to identify the query servers offering features with a given name.

16. The apparatus of claim 13, wherein said retrieving employs a read process that reads a key value from a feature store by retrieving a bucket of values associated with the key value.

17. An article of manufacture for querying one or more features extracted from one or more data records, comprising a tangible machine readable recordable medium containing one or more programs which when executed implement the steps of:
- obtaining a feature store database comprised of a plurality of buckets of values, wherein said feature store is comprised of said features extracted from said one or more data records stored as a key/value pair comprised of a key and a value, wherein said key comprises a feature identifier of a given one of said extracted features, wherein said key/value pair is stored in a given bucket identified by said key comprising said feature identifier, wherein said bucket of values comprises a mathematical set that stores a given value based on a timestamp of said given value and without regard to an order in which said values are written to said bucket;
- receiving, using at least one processing device, a query comprised of at least one query key, wherein each of said at least one query key is combined with at least one of said feature identifiers;
- retrieving, using at least one processing device, values from the feature store database that match the query key by employing a read process that reads a key value from the feature store database by retrieving a given one of said buckets of values associated with the key value; and
- returning one or more retrieved key/value pairs.

18. The article of manufacture of claim 17, further comprising the step of registering supported key/value pairs with a registry.

19. The article of manufacture of claim 17, further comprising the step of identifying the query servers offering features with a given name.

20. The article of manufacture of claim 19, further comprising the step of sending a given query comprised of said given name to said identified query servers.

* * * * *